Figure 1:
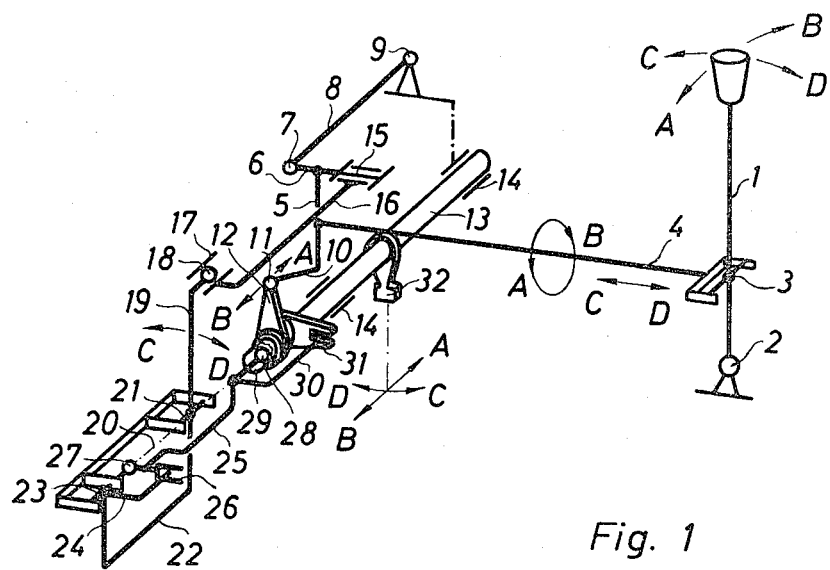

United States Patent [19]

Leitermann et al.

[11] 4,348,915

[45] Sep. 14, 1982

[54] SWITCHING APPARATUS FOR THE MECHANICAL REMOTE CONTROL OF THE GEAR BOX OF A MOTOR VEHICLE

[75] Inventors: Wulf Leitermann, Bad Wimpfen; Karl Pflugfelder, Neckarsulm, both of Fed. Rep. of Germany

[73] Assignee: Audi NsU Auto Union Aktiengesellschaft, Fed. Rep. of Germany

[21] Appl. No.: 149,016

[22] Filed: May 12, 1980

[30] Foreign Application Priority Data

May 31, 1979 [DE] Fed. Rep. of Germany ....... 2922137

[51] Int. Cl.³ .............................................. G05G 9/16
[52] U.S. Cl. .................................................. 74/473 R
[58] Field of Search .......... 74/473 R, 473 P, 473 SW, 74/475, 476, 477

[56] References Cited

U.S. PATENT DOCUMENTS

| | | | |
|---|---|---|---|
| 2,819,626 | 1/1958 | Stump | 74/473 |
| 3,645,145 | 2/1972 | Galas | 74/473 R |
| 3,805,635 | 4/1974 | Grosseau | 74/473 R |

Primary Examiner—Allan D. Herrmann
Attorney, Agent, or Firm—Kane, Dalsimer, Kane, Sullivan and Kurucz

[57] ABSTRACT

This invention relates to switching apparatus for mechanical remote control of the gear box of the motor vehicle.

A gear lever 1 is connected to one end of a gear selector rod 4 such that movement of the gear lever can cause axial or rotary movement of the rod. A two arm intermediate link 5 is connected to the other end of rod 4 for movement therewith. One arm is operatively connected to main gear shaft 13 by a link (10, 11 and 12) while the other arm is operatively connected to main gear shaft 13 by a link (6, 15, 16–19, 22, 24, 25, 30 and 31). The first mentioned link converts the rotary movement of rod 4 into longitudinal movement of shaft 13, while the second link converts axial movement of rod 4 into rotary movement of shaft 13.

The two links are so arranged so as to take up or absorb vibrational or other movement transmitted from the gear box so as to reduce or avoid vibration of gear lever 1.

4 Claims, 4 Drawing Figures

SWITCHING APPARATUS FOR THE MECHANICAL REMOTE CONTROL OF THE GEAR BOX OF A MOTOR VEHICLE

The invention relates to switching apparatus for the mechanical remote control of the gear box of a motor vehicle.

In switching apparatus in general, the movements, which emanate from the prime mover of the motor vehicle which is flange-mounted to the gear box, and arise from the vibrations of the engine itself, which is elastically suspended in the vehicle frame, and also arise during acceleration or deceleration, are comparatively violently transmitted to the gear lever. The unwelcome wobbling of the gear lever, which is caused by this, makes grasping of the gear lever more difficult and impairs accurate gear shifting. Such movements and vibrations are manifested exceptionally strongly if a very flexible non-rigid suspension is provided between the prime mover and vehicle frame to avoid vibration of the vehicle frame and to achieve better noise damping. In such a case, the shifting procedure may take place in an uncontrolled way, for example, when the gear lever is held fast by the driver, or even with extreme engine motion.

The object of the invention is to produce a switching apparatus which reduces the transmission of motion of the prime mover to the gear lever.

According to the present invention there is provided switching apparatus for the mechanical remote control of a motor vehicle gear box, having a gear lever which is movable in longitudinal and transverse directions and which is connected to a gear selector rod, the gear selector rod having a multiple-armed intermediate link which is connectable, in use, to the gear box via a first arm, a first ball and socket joint and a toggle link, and is connected via a second arm and a second ball and socket joint to at least one input lever, located on a main shaft for transmitting switching movement to the main shaft, wherein the intermediate link is connected via the second ball and socket joint to a selector lever which is rotatably movable but axially fixed on the main shaft of the gear box, and wherein a pin is mounted on the intermediate link to extend roughly parallel to the gear selector rod such that its longitudinal axis intersects the centre of rotation of the first ball and socket joint, a transmission rod having one end rotatably mounted on the pin and extending substantially perpendicularly to the gear selector rod, the other end of the transmission rod engaging in a transmission lever, which is rotatably mounted about an axis which is fixed, in use, with respect to the vehicle frame and extends roughly coaxially to the main shaft, the transmission lever being mounted in a ball and socket joint for movement perpendicular to the vehicle frame or to the transmission rod and being connected to a rotatable shaft for converting longitudinal movement of the transmission rod into a rotating movement and which engages in a control lever non-rotatably mounted on the main shaft, the axis of the rotatable shaft extending substantially parallel to the main shaft.

The proposed arrangement of the switching device, which provides for a longitudinal and transverse movement of the gear lever via partly separate rod linkages, has the advantage that the movements of the prime mover and the motion during acceleration and deceleration are only very slightly and non-detrimentally transmitted to the gear lever, even with a very non-rigid suspension in the vehicle frame. Moreover, the shifting procedure of the gear lever may be improved.

The switching apparatus can, for example, be so constructed that the selector lever and the control lever are located at one end of the main shaft, that a lever, which transmits the rotating movement, and a catch are located between the transmission lever and the rotatable shaft on the one hand, and between the rotatable shaft and the control lever on the other hand, and that the rotatable shaft is axially movable.

There is also possible, within the framework of the invention, a construction which provides for the selector lever to be located at the one end and the control lever at the other end of the main shaft, and the rotatable shaft to be fastened to the transmission lever and engage axially movably in the control lever. In order to prevent the transverse movements of the drive unit which occur influencing the switching device in this arrangement, the control lever can be bifurcated in construction and have in its limbs slots running axially towards the main shaft in which slots an engaging catch, which runs at right angles to the main shaft and is located on the rotatable shaft, engages.

Figure 2:
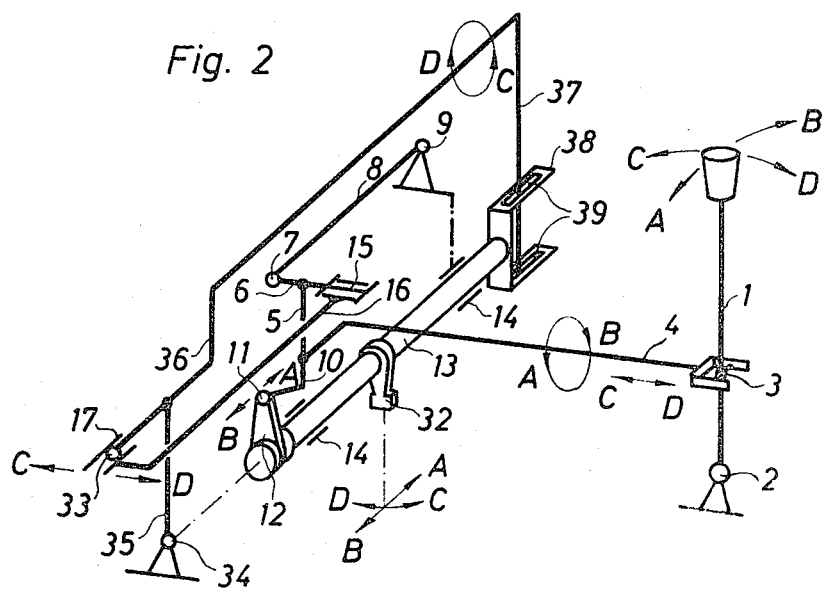
Figure 3:
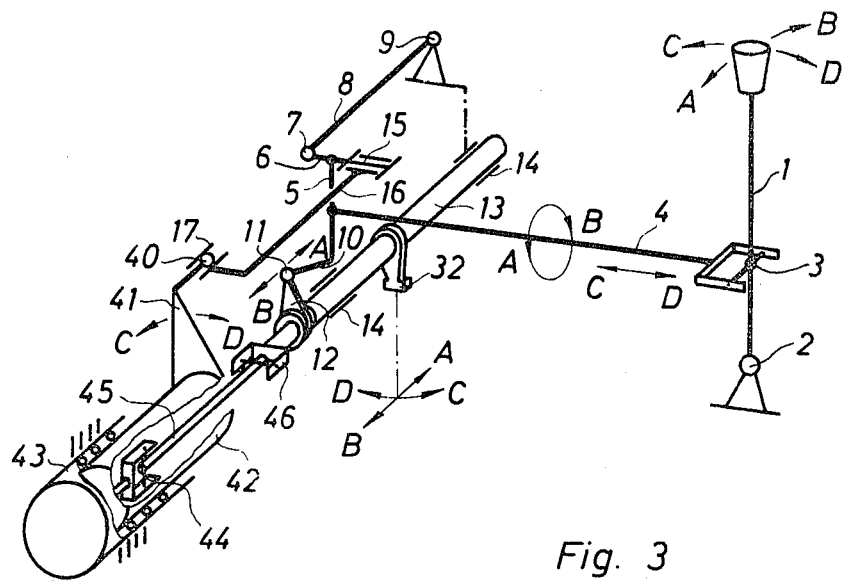
Figure 4:
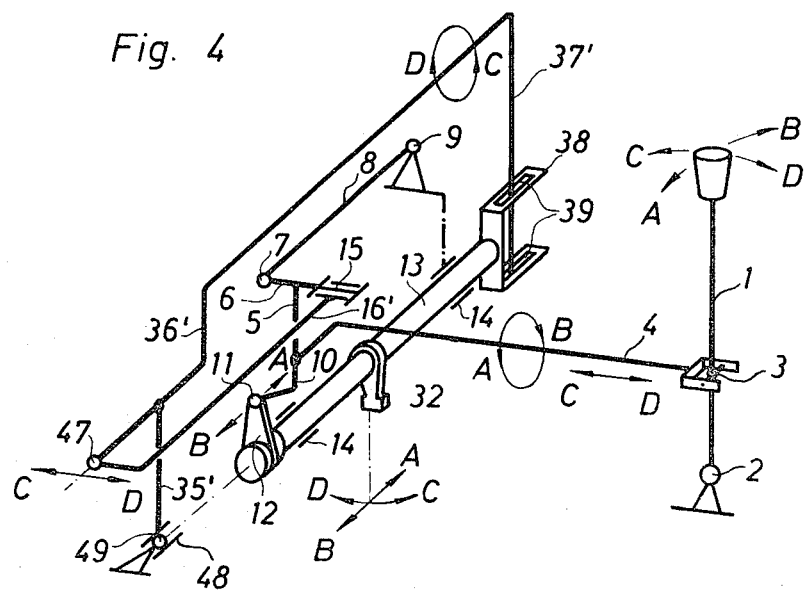

The invention may be performed in various ways and preferred embodiments thereof will now be described with reference to the accompanying drawings in which:

FIG. 1 is a diagrammatic perspective illustration of a first embodiment of a switching arrangement of the invention;

FIG. 2 similarly illustrates a second embodiment of a switching arrangement of the invention;

FIG. 3 illustrates a third embodiment of a switching arrangement which is similar to that of FIG. 1; and FIG. 4 illustrates a fourth embodiment of a switching arrangement which is similar to that of FIG. 2.

In FIG. 1 only those parts of a switching arrangement which are important to the invention are shown. The switching arrangement shown there has a gear lever 1, which is mounted in a ball and socket joint 2 in the floor of a motor vehicle (not shown), so as to be movable in several directions, and which is connected, via joint 3, to a gear selector rod 4 lying on an axis at right angles to the gear lever 1. The other end of the gear selector rod 4 carries an intermediate link 5 which is connected via an upwardly directed frist arm 6, to a ball and socket joint 7, a link rod 8 and a ball and socket joint 9 which is located on the gear box (not shown). A second arm 10 which extends downwardly from the gear selector rod 4 connects the intermediate line 5, via a ball and socket joint 11, to a selector lever 12. The lever 12 is rotationally but not axially movable on a main shaft 13 lying at right angles to the gear selector rod 4. The main shaft 13 is mounted for rotation and axial movement in the gear box in bearings 14 as shown diagrammatically.

On the intermediate link 5 is located a pin 15 running roughly parallel to the gear selector rod 4, the longitudinal axis of the pin 15 intersecting the centre of rotation of the ball and socket joint 7. A transmission rod 16, lying at right angles to the gear selector rod 4, is mounted on the pin 15 so as to rotate thereon but cannot move axially of the pin 15. The transmission rod 16, has at its other end, a sleeve 17 running roughly parallel to the main shaft 13, and a ball and socket joint 18 of a transmission lever 19 engages within the sleeve 17. A transmission lever 19 is mounted for rotation about an axis 20 running coaxially with the main shaft 13 in a bearing 21 and, via a rocker arm 22 running parallel to this axis, in a bearing 23, the bearing 21 and 23 being fastened to the vehicle frame (not shown). The vehicle frame, to which the bearings 21 and 23 are fastened, and the vehicle floor on which the ball and socket joint 2 is located, are perfectly rigidly connected together.

At the bearing 23 there is fastened, to the rocker arm 22, a radial lever arm 24, which engages in a catch 26 which is located on a rotatable shaft 25 running parallel to the axis 20. The rotatable shaft 25 is connected at one end to the catch 26 and to a ball and socket joint 27 on the axis 20, whilst its other end is axially movably accepted in a bore 29 in the main shaft 13 by a ball and socket joint 28. The rotatable shaft 25 carries, at a position close to the ball and socket joint 28, a radial lever arm 30 which axially movably engages in a control lever 31, which is fastened to the main shaft 13. A switching finger 32, which cooperates with gear shift forks (not shown) of the gearing, is rigidly connected to the main shaft 13.

The mode of operation of the switching device illustrated in FIG. 1 is as follows:

Switching movements of the gear lever 1 involve proportionate movements in predetermined directions A-B and C-D, where the movements of the gear lever 1 in the direction A-B produce rotation of the gear selector rod 4 and the movements in the direction C-D produce a longitudinal or axial movement of the gear selector rod 4. With movement in the direction A-B, the intermediate link 5, which is connected to the gear selector rod 4, is rotated about the ball and socket joint 7 (which is connected to the gearing via the toggle link 8), and therefore produces, via the arm 10 and the ball and socket joint 11, an axial shifting motion of the selector lever 12, whereby the switching finger 32 connected to the main shaft 13 is shifted in the longitudinal direction A-B. On the other hand, if the gear lever is moved in the direction C-D, the transmission rod 16, which is connected to the intermediate link 5 on the pin 15, is moved at right angles to the gear selector rod 4, and hence the transmission lever 19 is rotated, via the ball and socket joint 18, about the bearing 21. The rotational movement caused by movement C-D is transmitted via the rocker arm 22 and the bearing 23 to the lever arm 24, which rotates the rotatable shaft mounted in the connecting link 27 and 28 about the axis 20 and actuates the control lever 31 via the lever arm 30, whereby the switching finger 32 is moved into the aforementioned direction C-D. For the sake of clarity, the directions of movement of the switching finger 32 are indicated by a dot-dash connecting line running from the latter.

The arrangement allows transverse motion of the gearing with respect to the vehicle frame, which is roughly parallel to the main shaft 13, without that motion affecting the position of the gear lever 1. This is possible because the arrangement provides for axial movement of the ball and socket joint 28 in the bore 29 of the main shaft 13 of the lever arm 30 in the control lever 31, and also between the ball and socket joint 18 of the transmission lever 19 and the sleeve 17 of the transmission rod 16. Transmission of longitudinal motion of the gearing to the gear lever 1, which is at right angles to the main shaft 13, is prevented by the movability of the ball and socket joints 7 and 9 and the rotatability of the selector lever 12 in relation to the intermediate link 5, which is connected to the gear selector rod 4, and also by the ball and socket joints 27 and 28 of the main shaft 25.

FIG. 2 shows another embodiment of the invention. The same reference numbers as in FIG. 1 have been used for identical and similar parts. The sleeve 17 of the transmission rod 16 engages in a ball and socket joint 33 of a transmission lever 35 which is rotatably mounted on the vehicle frame by means of a ball and socket joint 34 about an axis which is roughly coaxial with the main shaft 13. Lever 35 is also rigidly connected to a rotatable shaft 36 which runs roughly parallel to the main shaft 13 in contrast to the arrangement in FIG. 1. The rotatable shaft 36 extends through the gear box (not shown) and is connected to bifurcated control lever 38 by means of an engaging catch 37, which extends perpendicularly to the main shaft 13. The control lever 38 is secured to that end of the main shaft 13 which is spaced from the selector lever 12. Slots 39 are provided in the limbs of the control lever 38 to receive the engaging catch 37 for axial movement with respect to the shaft 13.

This arrangement allows transverse motion of the gearing with respect to the vehicle frame without the motion affecting the position of the gear level 1. This is possible because the arrangement provides for axial movement of the ball and socket joint 33 of the transmission lever 35 in the sleeve 17 of the transmission rod 16 and between the slots 39 of the control lever 38 and the engaging catch 37. Longitudinal motion is absorbed by movement of the ball and socket joints 7 and 9 and by rotation of the selector lever 12 and also by the ball and socket joint 34 on the transmission lever 35.

A further embodiment is illustrated in FIG. 3. Again, the same reference numbers are used for identical and similar parts. In this embodiment the sleeve 17 of the transmission rod 16 engages in a ball and socket joint 40 of a transmission lever 41, which is mounted by a hollow cylinder 42 open at one end for axial and rotational movement in a cylindrical sleeve 43 formed in the vehicle frame and roughly extending coaxially with the main shaft 13. Cylinder 42 is non-rotatably connected to main shaft 13 by an axially extending assembly comprising a first cardan joint 44, one portion of which is connected to the closed end of cylinder 42, swivel shaft 45 and a further cardan joint 46 which act as a control lever.

This arrangement allows transverse motion of the gearing without affecting the position of the gear lever 1. This is possible because the arrangement provides for the axial movement of the cylinder 42 in the sleeve 43 and between the sleeve 17 of the transmission rod 16 and the ball and socket joint 40 of the transmission lever 41. The longitudinal motion is made possible by the movability of the ball and socket joints 7 and 9 and the rotatability of the selector lever 12 as in FIG. 1 and FIG. 2, and also by the cardan joints 44 and 46 of the rotatable shaft 45.

As illustrated in FIG. 4, in which the same reference numbers as in FIG. 1 and FIG. 2 have been used for identical and similar parts, the transmission rod 16' is connected, via a ball and socket joint 37, directly to the rotatable shaft 36'. The transmission lever 35', which is fastened to the rotatable shaft 36' is mounted by a sleeve 48 on a ball and socket joint 49 so as to be movable roughly coaxially with the main shaft 13 and axially to the latter.

In this exemplified embodiment a transverse motion of the gearing is possible as a result of the axial movability of the sleeve 48 of the transmission lever 35' on the ball and socket joint 49 and between the slots 39 of the control lever 38 and the engaging catch 37'. In longitudinal direction the motion is absorbed by the movability of the ball and socket joints 7 and 9 and the rotatability of the selector lever 12 and also by the ball and socket joint 47 on the transmission rod 16'.

As a result of the switching arrangements proposed, the drive unit and gearing can be suspended relatively non-rigidly in the vehicle frame to achieve better noise damping, without the switching position being altered or more violent motions of the drive unit causing the gear lever to wobble.

What is claimed is:

1. Switching arrangement for the mechanical remote control of a motor vehicle gear box having a main shaft comprising:
    a gear lever;
    means for mounting the gear lever for longitudinal and transverse movement with respect to the motor vehicle;
    a gear selector rod having an at least two armed intermediate link;
    means for connecting the gear lever to the gear selector rod;
    means for connecting one arm of the intermediate link to the gear box comprising a first ball and socket joint means, a pin mounted on the one arm to extend roughly parallel to the gear selector rod such that its longitudinal axis intersects the centre of rotation of the first ball and socket joint means, a transmission rod for converting longitudinal movement of the gear selector rod into rotating movement, said transmission rod extending substantially perpendicular to the gear selector rod; means for rotatably mounting one end of the transmission rod on the pin, a transmission lever, means for connecting the other end of the transmission rod to the transmission lever, second ball and socket joint means for rotatably mounting the transmission lever about an axis fixed with respect to the vehicle frame and roughly coaxial with the main shaft and for movement perpendicular, in use, to the vehicle frame or to the transmission rod, a rotatable shaft, its axis of rotation extending substantially parallel to the main shaft, means for connecting the transmission lever to the rotatable shaft, a control lever, means for non-rotatably mounting the control lever on the main shaft and means for engaging the rotatable shaft in the control lever; and
    means for connecting the second arm of the intermediate link to the gear box comprising a selector lever, means for rotatably mounting the selector lever on the main shaft and for holding the selector lever against axial movement thereon and a third ball and socket joint means for connecting the arm to the selector lever.

2. Switching apparatus as claimed in claim 1, wherein the selector lever and the control lever are located at one end of the main shaft, wherein a lever for transmitting rotatable movement, and a catch are arranged between the transmission lever and the main shaft on the one hand, and also between the rotatable shaft and the control lever on the other hand, and wherein the rotatable shaft if axially movable.

3. Switching apparatus as claimed in claim 1, wherein the selector lever is located at the one end of the main shaft and the control lever is located at the other end of the main shaft, and wherein the rotatable shaft is fastened to the transmission lever and is axially movable in the control lever.

4. Switching apparatus as claimed in claim 3, wherein the control lever is bifurcated, each of its limbs defining a slot extending axially with respect to the main shaft and further comprising an engaging catch extending perpendicular to the main shaft, means for mounting one end of the catch on the rotatable shaft for rotation herewith, the other end of the catch engaging in the slots.

* * * * *

UNITED STATES PATENT AND TRADEMARK OFFICE
CERTIFICATE OF CORRECTION

PATENT NO. : 4,348,915

DATED : September 14, 1982

INVENTOR(S) : Wulf Leitermann et al

It is certified that error appears in the above—identified patent and that said Letters Patent is hereby corrected as shown below:

On The Title Page,
Change the name of the assignee from "Audi NsU" to --Audi NSU--; and Column 2, line 46, "frist" should be --first--.

Signed and Sealed this

Twenty-third Day of November 1982

[SEAL]

Attest:

GERALD J. MOSSINGHOFF

*Attesting Officer*    *Commissioner of Patents and Trademarks*